C. E. BERGER.
TIMER FOR EGG BOILERS.
APPLICATION FILED AUG. 26, 1915.
1,184,812.  Patented May 30, 1916.
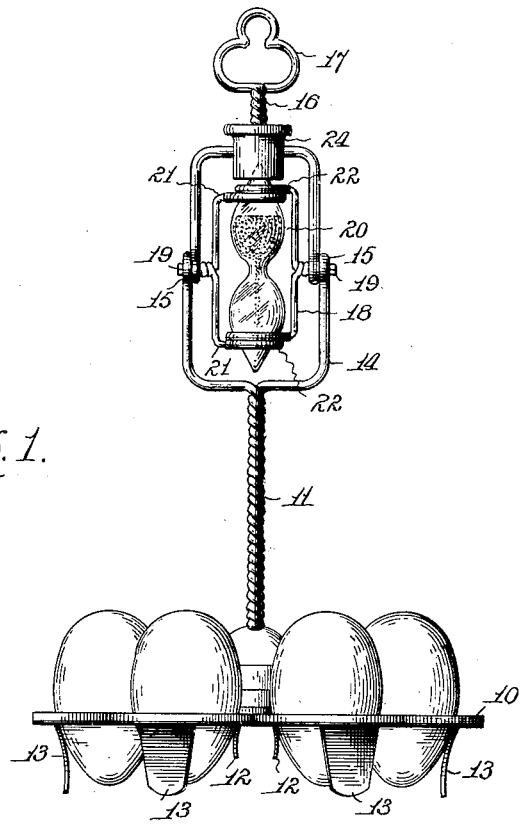
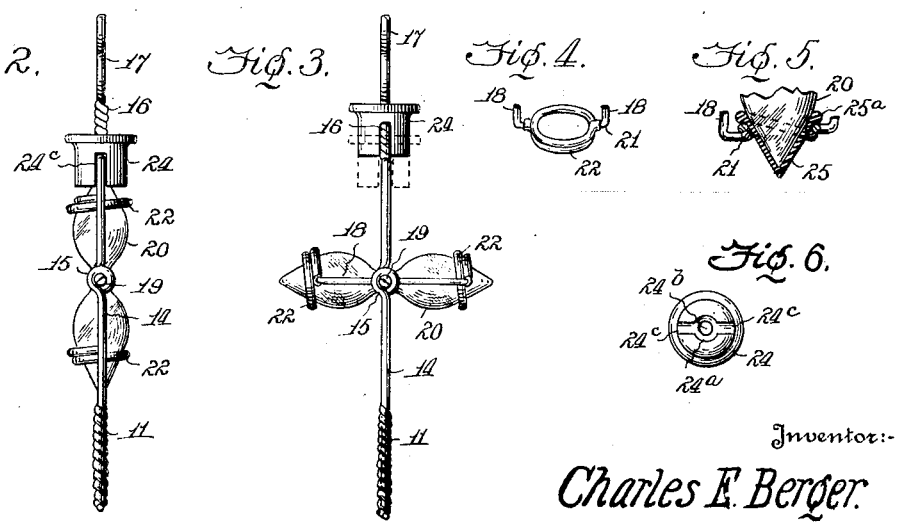
Inventor:-
Charles E. Berger.
By John B. Thomas & Co.
Attorneys.

UNITED STATES PATENT OFFICE.

CHARLES E. BERGER, OF MUNHALL, PENNSYLVANIA, ASSIGNOR OF ONE-HALF TO HENRY HOWDEN, OF HOMESTEAD, PENNSYLVANIA.

TIMER FOR EGG-BOILERS.

1,184,812. Specification of Letters Patent. Patented May 30, 1916.

Original application filed March 31, 1915, Serial No. 17,736. Divided and this application filed August 26, 1915. Serial No. 47,546.

*To all whom it may concern:*

Be it known that I, CHARLES E. BERGER, a citizen of the United States, residing at Munhall, in the county of Allegheny and State of Pennsylvania, have invented a Timer for Egg-Boilers, of which the following is a full and complete specification.

This application is a division of the application for patent filed by me March 31, 1915; Serial No. 17,736.

The principal object of my present invention is to provide an egg boiling device or egg-carrier with a minute-glass for accurately timing the boiling operation; the minute-glass in the present instance being mounted in a frame trunnioned in the handle of the egg-carrier so that it may be conveniently turned and securely held in vertical position for the stand to run from one compartment to the other.

With this object in view my invention consists primarily in the particular construction of the rotatable frame containing the minute-glass, whereby the latter is cushioned in said frame, in connection with means movably mounted on the handle of the egg-carrier to engage either end of the minute-glass and hold it in operative position; all as hereinafter fully described in the following specifications, and more specifically set forth in the appended claims.

In the accompanying drawings, forming a part hereof—Figure 1 is a front elevation of an egg boiling device constructed in accordance with my invention. Fig. 2 is a detail side view, showing the particular manner of supporting the minute-glass; Fig. 3 is a similar view, with the minute-glass turned partially around. Figs. 4, 5 and 6 are details hereinafter referred to.

Like numerals of reference indicate like parts in all the figures of the drawings.

In carrying out my invention I employ in the first instance an egg carrier or tray 10, having a handle 11 attached to and projecting upwardly from the center thereof; said tray being provided with suitable openings to receive the eggs, and with downwardly projecting resilient tongues 12 and 13 at the edges of the openings to yieldingly support said eggs therein. The supporting tongues 13, at the outer portions of the tray, are longer than the companion tongues 12, to provide feet upon which the device may rest to keep the eggs from the bottom of the cooking utensil and from striking the top of a table while the tray is being filled or the cooked eggs removed. The handle 11 may be attached to the tray in any suitable manner, but preferably in the manner shown and described in my companion application hereinbefore referred to.

The handle of the egg-carrier is provided near its upper end with a rectangular frame 14, provided at opposite sides with bearing-apertures 15, and said handle is extended upwardly from the center of the frame for a short distance, as at 16, and terminates in a grasping and suspending loop 17. This handle, including the frame, is preferably formed from a single piece or length of wire, which is first bent upon itself centrally to form the loop 17, twisted together to provide the short shank 16, then separated and extended to provide the rectangular frame 14, below which the two members of the wire are brought together again and twisted to form the lower portion or long shank of the handle. In this instance the bearing-apertures 15 in the sides of the rectangular frame are formed by simply coiling the wire upon itself, as shown in the drawings.

Mounted in the rectangular frame 14 of the handle of the egg-carrier is a rotatable frame 18, having trunnions 19 which engage in the bearing-apertures 15, and this rotatable frame carries a minute-glass 20. This rotatable frame is in the present instance made of two strands of wire of suitable gage, the ends of the wires being twisted together to form the trunnions, and the intermediate portions separated, extended, and formed into coils 21, 21, to receive the ends of the minute-glass. In order to cushion the minute-glass and thereby protect it from breakage each coil is provided with a cushion, preferably in the form of a rubber tube 22, which is slipped on to the wire before the coil is formed. The minute-glass extends between the rubber-covered coils of the frame, and the ends of said glass project slightly beyond the coils, for the purpose hereinafter explained. In this manner the minute-glass is yieldingly supported within the rotatable frame to relieve it of any jar to which the egg-carrier may be subjected, so as to not only prevent breakage of said minute-glass but also prevent the sand from clogging in the neck between the compartments. It will be noted, further, that the rubber tubes forming the cushioning coils project beyond the planes of the front and rear sides of the minute-glass to protect the latter from contact with a straight surface against which the handle of the egg-carrier may strike.

The frame carrying the minute-glass may be conveniently turned on its trunnion bearings to change the relative location of the compartments, for permitting the sand to run from one to the other, and conversely, and in order to hold the minute-glass with its supporting frame in either operative position I slidably mount on the short shank 16 of the handle of the egg-carrier a button or sleeve 24, provided in its lower end with a conical recess 24$^a$ approximating the contour of the ends of the minute-glass so as to fit thereover. The button or sleeve is also provided with a central opening, 24$^b$, to receive the shank, and with side slots 24$^c$, 24$^c$, into which pass the upper ends of the rectangular frame of the handle of the egg-carrier.

In using the device the eggs are placed in the tray and the minute-glass turned and engaged by the holding-sleeve, after which the device is immediately placed in the boiler or cooking vessel so that when the sand runs from the upper to the lower compartment of the glass the eggs will have remained in the boiler the required length of time. Therefore, in cooking eggs with this device it is only necessary to glance at the timing device to note the running of the sand, the handle of the egg-carrier being of such length with respect to the depth of the boiler or cooking vessel as to locate the minute-glass above said boiler or vessel. It will be understood, of course, that I may employ a glass requiring any predetermined time for the sand to run from one compartment to the other, corresponding to the time it is desired that the eggs remain in the boiler or cooking vessel, for instance three minutes.

The device provides a very simple, cheap and effective means for boiling eggs, as it will not only time the boiling of the eggs but will also permit them to be easily placed in the boiler or cooking vessel and removed therefrom, and after being removed the device with the eggs may be placed on a dining-table so as to be removed as they are needed for use.

In the modification, shown in Fig. 5 of the drawings, I contemplate using a rubber cap 25 on each end of the minute-glass, to form a cushion between said glass and the coil 21 of the wire frame, the inner edge of the cap being provided with an enlarged rim 25$^a$, and in this instance the end of the minute-glass is also cushioned for contact with the holding button or sleeve 24.

Having described my invention, I claim:

1. A timer for egg boilers comprising a supporting frame having a short shank above said frame, a smaller frame trunnioned in the aforementioned frame and carrying a minute-glass, and a sleeve slidable on the shank to engage either end of the minute-glass, substantially as shown and described.

2. A timer for egg boilers comprising a supporting frame having bearing-eyes at opposite sides, a smaller frame trunnioned in the bearing eyes in the aforementioned frame and carrying a minute-glass, a rubber cushion between the minute-glass and its frame, and means slidable on the first mentioned frame to engage either end of the minute-glass, substantially as shown and described.

3. A timer for egg boilers comprising a supporting frame, a wire frame having trunnions by which it is pivoted in the aforementioned frame and coils receiving the ends of the minute-glass, and rubber tubing on the coils to form a cushion for the minute-glass; together with means for holding the minute-glass in vertical position, substantially as shown and described.

CHARLES E. BERGER.

Witnesses:
ANDREW J. HUNTER,
EDGAR W. LAYMAN.